(12) United States Patent
Honda

(10) Patent No.: US 9,053,628 B2
(45) Date of Patent: Jun. 9, 2015

(54) SYSTEM AND METHOD FOR COLLECTING DATA USING A WIRELESS COMMUNICATION CHANNEL

(71) Applicant: FUJITSU LIMITED, Kawasaki-shi, Kanagawa (JP)

(72) Inventor: Atsushi Honda, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 354 days.

(21) Appl. No.: 13/722,462

(22) Filed: Dec. 20, 2012

(65) Prior Publication Data

US 2013/0162442 A1 Jun. 27, 2013

(30) Foreign Application Priority Data

Dec. 27, 2011 (JP) ................. 2011-286547

(51) Int. Cl.
*H04Q 9/00* (2006.01)
*G08C 17/02* (2006.01)

(52) U.S. Cl.
CPC .................. *G08C 17/02* (2013.01); *H04Q 9/00* (2013.01); *H04Q 2209/40* (2013.01); *H04Q 2209/823* (2013.01)

(58) Field of Classification Search
CPC .......... H04Q 2209/00; H04Q 2209/40; H04Q 2209/60; H04Q 2209/823; G01D 4/004; Y04S 20/322; Y02B 90/242; G08C 17/02
USPC .............. 340/870.01–870.09, 870.12, 870.18
See application file for complete search history.

(56) References Cited

U.S. PATENT DOCUMENTS

| 5,914,673 | A  | * | 6/1999 | Jennings et al. | .......... 340/870.03 |
| 6,566,997 | B1 | * | 5/2003 | Bradin | .......... 340/10.2 |
| 2012/0021689 | A1 | * | 1/2012 | Han | .......... 455/63.1 |

FOREIGN PATENT DOCUMENTS

JP 2006-254398 A 9/2006

* cited by examiner

*Primary Examiner* — Brian Zimmerman
*Assistant Examiner* — Laura Nguyen
(74) *Attorney, Agent, or Firm* — Arent Fox LLP

(57) ABSTRACT

A first apparatus receives, from a second apparatus, a signal including information on first time-periods each associated with an occupancy rate, using a wireless channel. The first time-periods each indicate a time-period during which data are scheduled to be collected by the second apparatus, and the occupancy rate indicates a ratio of a duration-time during which data are actually collected by the second apparatus using the wireless channel, to the each first time-period. The first apparatus, based on the occupancy rate and the received power of the first signal, calculates interference values each indicating a degree of interference caused by a radio wave from the second apparatus during the each first time-period, and acquires, based on the calculated interference values, second time-periods during which data are scheduled to be collected by the first apparatus, and collects data from a node apparatus during the third time-periods using the wireless channel.

7 Claims, 8 Drawing Sheets

FIG. 2

| CONTROL INFORMATION | PAN ID | TRANSMISSION SOURCE INFORMATION | PAYLOAD AREA | | | CHECK INFORMATION |
|---|---|---|---|---|---|---|
| | | | TRANSMISSION TIME | COLLECTION TIME-PERIOD #1 (START TIME, END TIME, OCCUPANCY RATE) | COLLECTION TIME-PERIOD #2 (START TIME, END TIME, OCCUPANCY RATE) ... | |
| | | | MEASURED DATA | | | |

FIG. 4

| TRANS-MISSION NODE ID | RECEPTION TIME | RECEIVED POWER (dBm) | TRANS-MISSION TIME | COLLECTION TIME-PERIOD #1 ||| COLLECTION TIME-PERIOD #2 ||| COLLECTION TIME-PERIOD #3 |||
| --- | --- | --- | --- | --- | --- | --- | --- | --- | --- | --- | --- | --- |
| | | | | START TIME | END TIME | INTERFERENCE VALUE (dBm) | START TIME | END TIME | INTERFERENCE VALUE (dBm) | START TIME | END TIME | INTERFERENCE VALUE (dBm) |
| GW2 | 08:59:28 | -70 | 09:01:00 | 09:10:00 | 09:20:00 | -92 | 09:25:00 | 09:38:00 | -88 | 09:50:00 | 10:05:00 | -95 |
| GW3 | 09:00:47 | -90 | 09:00:00 | 09:12:00 | 09:15:00 | -105 | 09:20:00 | 09:30:00 | -95 | 09:45:00 | 09:55:00 | -105 |

SYSTEM AND METHOD FOR COLLECTING DATA USING A WIRELESS COMMUNICATION CHANNEL

CROSS-REFERENCE TO RELATED APPLICATION

This application is based upon and claims the benefit of priority of the prior Japanese Patent Application No. 2011-286547, filed on Dec. 27, 2011, the entire contents of which are incorporated herein by reference.

FIELD

The embodiment discussed herein is related to a system and method for collecting data using a wireless communication channel.

BACKGROUND

In recent years, a technology called a M2M (Machine to Machine) service has been developed in which environmental data such as temperature, illuminance, and humidity are measured by a node apparatus equipped with a sensor and others and the measured data are collectively collected via wireless communications. For example, in a M2M service in the field of agriculture, pieces of information about temperature, water content in soil, and others detected by a node apparatus equipped with a sensor installed in a farm are collected with a wireless communication function of the node apparatus to one place, thereby managing the growth of crop.

A system to which this M2M service is applied includes a data collecting apparatus as a gateway for wireless communication with a plurality of node apparatuses associated with respective data collecting apparatuses. With these data collecting apparatuses communicating with their corresponding node apparatuses, data in the node apparatuses are collected.

However, in the system to which the M2M service is applied, there is a problem of interference arising between data collecting apparatuses. That is, radio waves from the data collecting apparatuses interfere with each other when the data collecting apparatuses are adjacently arranged and communicate in parallel with the node apparatuses by using a communication channel of the same frequency. As a technology for avoiding this interference between data collecting apparatuses, there is a technology in which a data collecting apparatus transmits and receives a beacon signal to and from another data collecting apparatus by using a common channel. In this technology, when one data collecting apparatus receives a beacon signal containing information indicating a data collection time of another data collecting apparatus, the data collecting apparatus specifies a time other than the data collection time of the other data collecting apparatus as a non-interference time, and acquires its own data collection time from the non-interference time.

Japanese Laid-open Patent Publication No. 2006-254398 is an example of related art.

SUMMARY

According to an aspect of the invention, a system includes a first node apparatus configured to measure first data to be collected and a first data-collecting apparatus. The first data-collecting apparatus collects the first data from the first node apparatus using a predetermined wireless communication channel having a predetermined frequency, and receives, from a second data-collecting apparatus to collect second data from a second node apparatus using the predetermined wireless communication channel, a first signal including information on first time-periods each associated with an occupancy rate, using the predetermined wireless communication channel, the first time-periods each indicating a time-period during which the second data are scheduled to be collected from the second node apparatus by the second data-collecting apparatus, the occupancy rate indicating a ratio of a duration time during which the second data are actually collected by the second data-collecting apparatus, to the each first time-period. The first data-collecting apparatus measures received power of the first signal, and calculates, based on the occupancy rate included in the first signal and the received power of the first signal, interference values each indicating a degree of interference that is caused by a radio wave from the second data-collecting apparatus during the each first time-period. Then, the first data-collecting apparatus determines second time-periods excluding time-periods during which at least one of the calculated interference values is greater than a threshold value, acquires, from the determined second time-periods, third time-periods during which the first data are scheduled to be collected by the first data-collecting apparatus, and transmits the first signal including information on the third time-periods to the first node apparatus using the predetermined wireless communication channel. The first node apparatus transmits, upon receiving the first signal, a second signal including the measured first data to the first data-collecting apparatus during the third time-periods indicated by the received first signal, using the predetermined wireless communication channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a format of a signal to be transmitted and received in a data collecting system, according to an embodiment;

FIG. 4 is a diagram illustrating an example of an interference value storage unit, according to an embodiment;

DESCRIPTION OF EMBODIMENT

With the related art described above, interference between data collecting apparatuses may be avoided. However, there is a problem that use efficiency of a communication channel in collecting data is disadvantageously decreased.

That is, in the communication channel for use in collecting data, a time other than the data collection time of another data collecting apparatus is specified as a non-interference time. Therefore, the data collecting apparatus fails to acquire the data collection time of the other data collecting apparatus as its own data collection time. However, even if data collection is actually performed in the data collection time of the other data collecting apparatus, a situation may be expected in which radio waves from the other data collecting apparatus are relatively subtle and the degree of interference by the radio waves from the other data collecting apparatus is relatively low. Even in this situation, according to the related art described above, the data collecting apparatus fails to acquire the data collection time of the other data collecting apparatus as its own data collection time. As a result, use efficiency of the communication channel for use in collecting data may be decreased.

A data collecting system, data collecting apparatus, and data collecting method according to an embodiment of the present disclosure is described in detail below with reference to the drawings. Note that this embodiment does not restrict the disclosed technology.

Embodiment

First, the structure of the data collecting system according to an embodiment is described.

Figure 1:
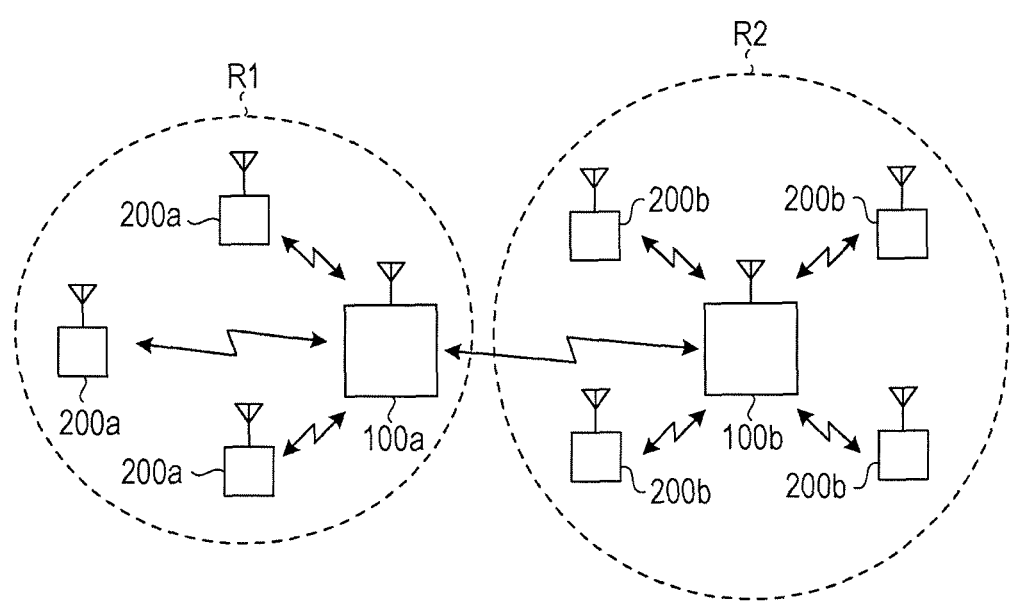
FIG. 1 is a diagram illustrating a configuration example of a data collecting system, according to an embodiment.

FIG. 1 is a diagram illustrating a configuration example of a data collecting system, according to an embodiment. As depicted in FIG. 1, the data collecting system according to the embodiment includes node apparatuses 200a and 200b measuring data and data collecting apparatuses 100a and 100b performing wireless communications with the node apparatuses 200a and 200b, respectively. The data collecting apparatus 100a is communicably coupled to the node apparatuses 200a, and the data collecting apparatus 100b is coupled to the node apparatuses 200b. That is, a region where the data collecting apparatus 100a is in charge of communications with the node apparatuses 200a is a region R1, and the node apparatuses 200a are located in this region R1. Also, a region where the data collecting apparatus 100b is in charge of communications with the node apparatuses 200b is a region R2, and the node apparatuses 200b are located in this region R2. In this manner, the data collecting apparatuses 100a and 100b are configured to wirelessly communicate with the respective node apparatuses 200a and 200b, and to collect data measured by the respective node apparatuses 200a and 200b.

In the data collecting system depicted in FIG. 1, when the data collecting apparatuses 100a and 100b adjacently arranged perform communications with the node apparatuses 200a and 200b, respectively, by using a communication channel of the same frequency, radio waves from the respective data collecting apparatuses 100a and 100b may interfere with each other. For example, radio waves from the data collecting apparatus 100a collecting data from the node apparatuses 200a located in the region R1 and radio waves from the data collecting apparatus 100b collecting data from the node apparatuses 200b located in the region R2 may interfere with each other.

According to the embodiment, to avoid this interference between the data collecting apparatuses 100a and 100b, one of the data collecting apparatuses 100a and 100b transmits and receives a broadcast signal to and from the other data collecting apparatus by using a predetermined communication channel. Then, based on information contained in the broadcast signal received from the other data collecting apparatus, the one of the data collecting apparatuses 100a and 100b detects a degree of interference from the other data collecting apparatus, and determines data collection time-periods thereof so that the determined data collection time-periods exclude time-periods during which a relatively large degree of interference is detected.

FIG. 2 is a diagram of an example of a format of a signal to be transmitted and received in a data collecting system, according to an embodiment. In FIG. 2, control information indicates the type of a signal. A value of "00" indicates a broadcast signal, and a value of "10" indicates a data signal. Personal area network identity (PAN ID) is identification information identifying a common communication area in which the data collecting apparatus is associated with node apparatuses. Transmission source information is identification information identifying a signal transmission source, that is, a data collecting apparatus or a node apparatus. Check information is used for correcting an error in the signal.

A payload area is an area in which various types of information according to the control information are stored. For example, when the control information has a value of "00" indicating a broadcast signal, information about a transmission time of the signal and collection time-periods during which the data collecting apparatus collects data from node apparatuses, is stored in the payload area. The information about a collection time-period includes a start time of the collection time-period, an end time of the collection time-period, and an occupancy rate indicating a ratio of a duration time during which data are actually collected to the collection time-period during which data are allowed to be collected. Meanwhile, when the control information has a value of "10" indicating a data signal, measured data obtained from measurement by a node apparatus is stored in the payload area.

Figure 3:
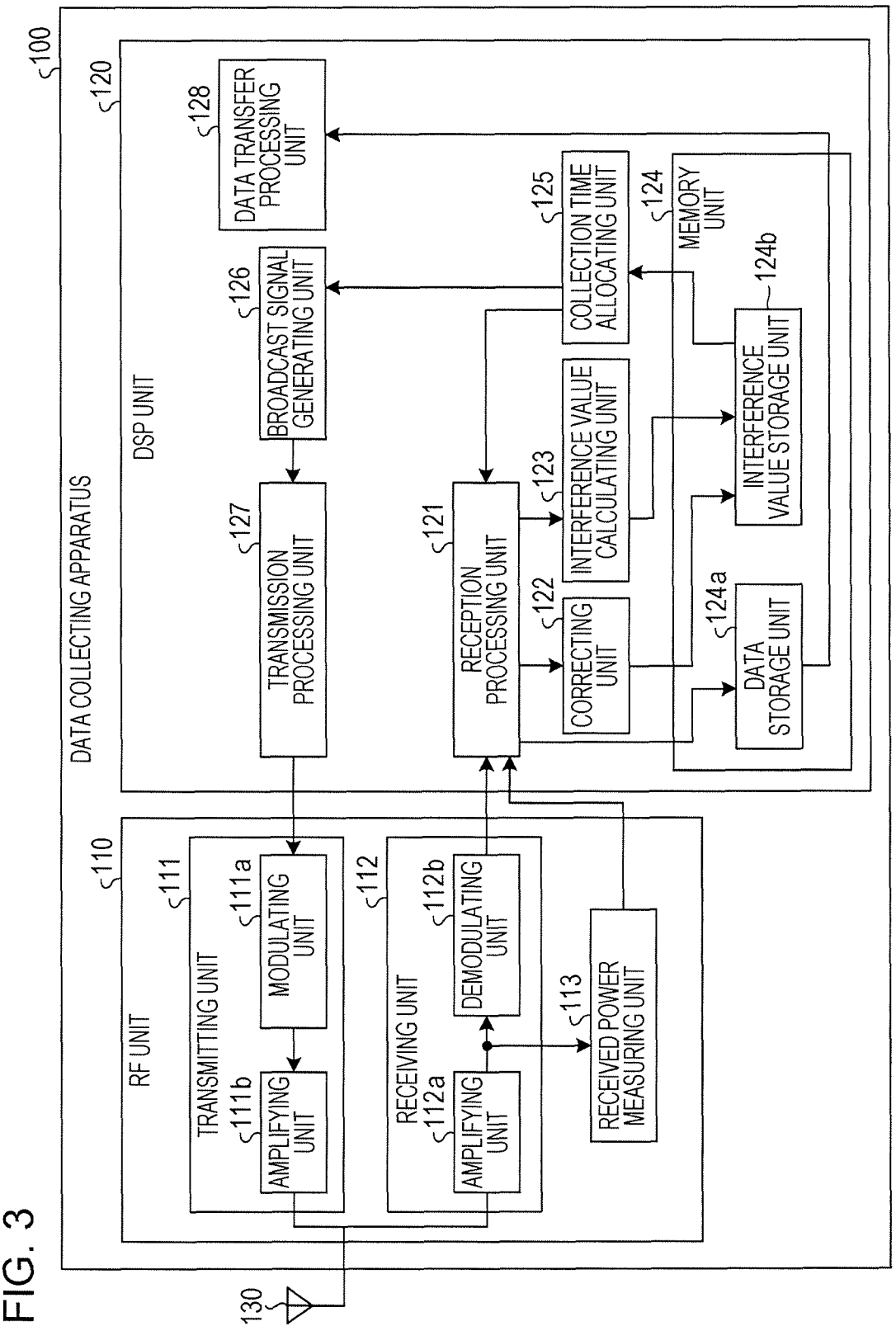
FIG. 3 is a diagram illustrating a configuration example of a data collecting apparatus, according to an embodiment.

FIG. 3 is a diagram illustrating a configuration example of a data collecting apparatus, according to an embodiment. In FIG. 3, the data collecting apparatus 100 corresponds to any one of the data collecting apparatuses 100a and 100b depicted in FIG. 1.

The data collecting apparatus 100 depicted in FIG. 3 includes a radio frequency (RF) unit 110 and a digital signal processing (DSP) unit 120. An antenna 130 is connected to the RF unit 110.

The RF unit 110 includes a transmitting unit 111, a receiving unit 112, and a received power measuring unit 113. The transmitting unit 111 includes a modulating unit 111a and an amplifying unit 111b. The modulating unit 111a modulates the amplitude of a broadcast signal inputted from the DSP unit 120. The amplifying unit 111b amplifies gain of a carrier wave of the broadcast signal amplitude-modulated by the modulating unit 111a, and output the amplified carrier wave to the antenna 130.

The receiving unit 112 includes an amplifying unit 112a and a demodulating unit 112b. The amplifying unit 112a amplifies the gain of the carrier wave received from the antenna 130. The demodulating unit 112b amplitude-demodulates the carrier wave inputted from the amplifying unit 112a to demodulate an analog signal from the bit data contained in the carrier wave. The analog signal demodulation by the demodulating unit 112b is input to the DSP unit 120.

The received power measuring unit 113 measures received power of the carrier wave (signal) received from the antenna 130. For example, the received power measuring unit 113 measures, from among signals received from the antenna 130, received power of the broadcast signal received from the other data collecting apparatus, and output the measured received power to the DSP unit 120.

The DSP unit 120 includes a reception processing unit 121, a correcting unit 122, an interference value calculating unit 123, a memory unit 124, a collection time allocating unit 125, a broadcast signal generating unit 126, a transmission processing unit 127, and a data transfer processing unit 128.

The reception processing unit 121 receives a broadcast signal from another data collecting apparatus by using a predetermined communication channel. For example, when the control information of the received signal indicates a value of "00" meaning a broadcast signal, the reception processing unit 121 recognizes the received signal as a broadcast signal. Then, the reception processing unit 121 extracts a transmission time contained in the recognized broadcast signal, and outputs the extracted transmission time to the correcting unit 122. Then, the reception processing unit 121 extracts information about collection time-periods (each including a start time, an end time, and an occupancy rate) contained in the recognized broadcast signal, and outputs the extracted information to the correcting unit 122 and the interference value calculating unit 123.

Upon acquiring the received power of the broadcast signal from the received power measuring unit 113, the reception processing unit 121 outputs the acquired received power of the broadcast signal to the interference value calculating unit 123.

Further, the reception processing unit 121 receives a data signal from the node apparatus 200. For example, when the control information of the received signal has a value of "10" meaning a data signal, the reception processing unit 121 recognizes the received signal as a data signal. Then, the reception processing unit 121 extracts the measured data contained in the recognized data signal, and stores the extracted measured data in a data storage unit 124a of the memory unit 124.

Also, when the currently-used communication channel is changed by the collection time allocating unit 125 (which will be described later), from an initial communication channel to another communication channel, the reception processing unit 121 receives a broadcast signal again by using the changed another communication channel.

The correcting unit 122 receives a transmission time contained in the broadcast signal from the reception processing unit 121. The correcting unit 122 further receives the start time and the end time of the collection time-period contained in the broadcast signal from the reception processing unit 121. The correcting unit 122 further acquires a reception time at which the broadcast signal is actually received by the reception processing unit 121. Then, based on a difference between the reception time and the transmission time, the correcting unit 122 corrects the start time and the end time of the collection time-period. For example, it is assumed that the reception time is "8:59:28" (eight o'clock, fifty-nine minutes, and twenty-eight seconds) and the transmission time is "9:01:00" (nine o'clock and one minute). In this case, the correcting unit 122 obtains +1 minute 32 seconds as a difference between the reception time and the transmission time, and corrects the start time and the end time of the collection time-period by subtracting the difference from the start time and the end time of the collection time-period. Then, the correcting unit 122 stores the corrected start time and end time of the collection time-period in an interference value storage unit 124b of the memory unit 124. With this, even if the transmission time contained in the broadcast signal and the actual reception time of the broadcast signal by the data collecting apparatus 100 have a difference, a correct collection time-period in which this difference is reflected may be stored in the interference value storage unit 124b.

Based on the occupancy rate contained in the broadcast signal and the received power of the broadcast signal, the interference value calculating unit 123 calculates, for each of the other data collecting apparatuses, an interference value indicating a degree of interference of radio waves from the other data collecting apparatus over the data collecting apparatus 100 during the collection time-period. The interference value may be obtained using equation (1) below. The interference value calculating unit 123 stores the calculated interference values in the interference value storage unit 124b, in association with identification information identifying the respective other data collecting apparatuses.

$$P_i = P_b + Y \quad (1)$$

where $P_i$ indicates an interference value in units of dBm during a collection time-period, and $P_b$ indicates received power of the broadcast signal in units of dBm. Further, $Y = 10 \times \log_{10}(X/100)$ where X indicates an occupancy rate.

For example, assume that the occupancy rate X contained in the broadcast signal is "10%" and the received power $P_b$ of the broadcast signal is "-70 dBm". In this case, the interference value $P_i$ is "$-70 + 10 \times \log_{10}(10/100) = -80$ dBm".

Further, the interference value calculating unit 123 performs the following process when a broadcast signal is received by the reception processing unit 121 from the other data collecting apparatus from which the previous broadcast signal has been received. That is, based on the received power of the received broadcast signal and the occupancy rate of the broadcast signal, the interference value calculating unit 123 calculates an interference value again. Then, by using the again calculated interference value, the interference value calculating unit 123 updates the interference value that is stored in the interference value storage unit 124b in association with the identification information identifying the other data collecting apparatus from which the previous broadcast signal has been received. With this, the interference values stored in the interference value storage unit 124b may be kept at the latest values.

The memory unit 124 includes the data storage unit 124a and the interference value storage unit 124b. The data storage unit 124a stores measured data contained in the data signal received by the reception processing unit 121.

The interference value storage unit 124b stores the interference values in association with the identification information identifying the respective other data collecting apparatuses.

FIG. 4 is a diagram illustrating an example of an interference value storage unit, according to an embodiment. As depicted in FIG. 4, the interference value storage unit 124b has information items including "transmission node ID", "reception time", "received power", "transmission time", and "collection time-period". "Collection time-period" has information items including "start time", "end time", and "interference value". "Transmission node ID" represents identification information identifying other data collecting apparatus, and stores, for example, transmission source information contained in the broadcast signal. "Reception time" represents a reception time at which the broadcast signal is actually received from the other data collecting apparatus by the data collecting apparatus 100. "Received power" represents received power of the broadcast signal from the other data collecting apparatus. "Transmission time" represents a transmission time at which the broadcast signal is transmitted from the other data collecting apparatus. "Collection time-period" represents a time-period during which data are allowed to be collected by the other data collecting apparatus from node apparatuses associated with the other data collecting apparatus, and includes a start time of the collection time-period, an end time of the collection time-period, and an interference value of the collection time-period.

As depicted in the first line of a table in FIG. 4, "interference value" is "−92 dBm" when a data collecting apparatus identified by "transmission node ID" of "GW2" collects data during "collection time-period #1" from "start time" of "09:10:00" to "end time" of "09:20:00". "Interference value" is "−88 dBm" when the data collecting apparatus identified by "transmission node ID" of "GW2" collects data during "collection time-period #2" from "start time" of "09:25:00" to "end time" of "09:38:00". "Interference value" is "−95 dBm" when the data collecting apparatus identified by "transmission node ID" of "GW2" collects data during "collection time-period #3" from "start time" of "09:50:00" to "end time" of "10:05:00".

Also, as depicted in the second line of the table in FIG. 4, "interference value" is "−105 dBm" when a data collecting apparatus identified by "transmission node ID" of "GW3" collects data during "collection time-period #1" from "start time" of "09:12:00" to "end time" of "09:15:00". "Interference value" is "−95 dBm" when the data collecting apparatus identified by "transmission node ID" of "GW3" collects data during "collection time-period #2" from "start time" of "09:20:00" to "end time" of "09:30:00". "Interference value" is "−105 dBm" when the data collecting apparatus identified by "transmission node ID" of "GW3" collects data during "collection time-period #3" from "start time" of "09:45:00" to "end time" of "09:55:00".

Referring back to FIG. 3, the collection time allocating unit 125 specifies non-interference time-periods excluding time-periods during which the interference value calculated for each of the other data collecting apparatuses is equal to or larger than a threshold, and acquires, from the specified non-interference time-periods, own collection time-periods during which data are allowed to be collected by the data collecting apparatus 100. Note that the own collection time-periods are predetermined according to a data rate at which data are collected by the data collecting apparatus 100.

When the collection time allocating unit 125 fails to acquire the own collection time-periods from the non-interference time-periods, the collection time allocating unit 125 changes the currently-used communication channel to another communication channel having a different frequency band, and assigns the changed communication channel to the reception processing unit 121.

Figure 5:
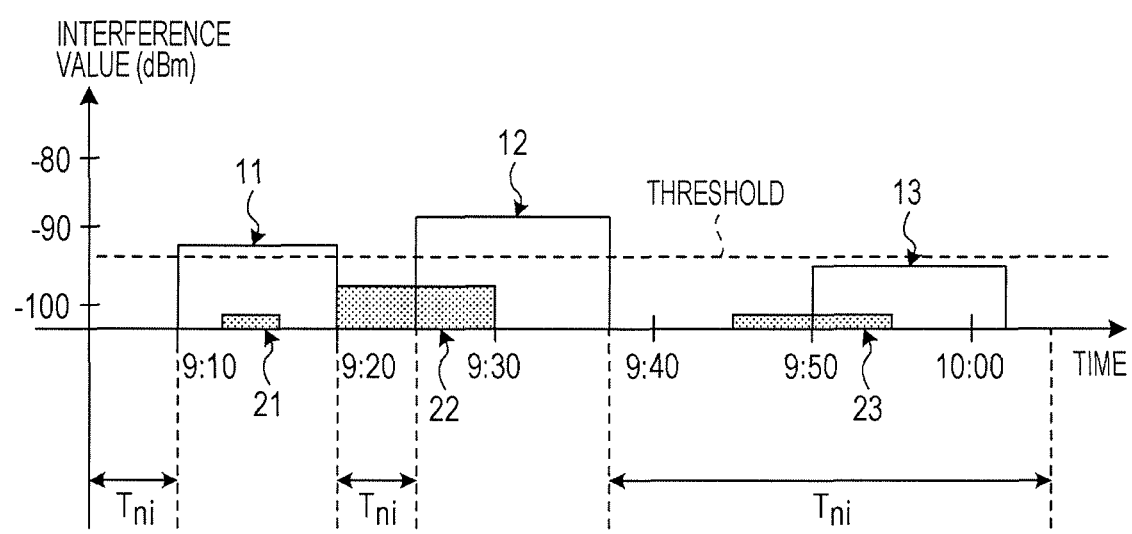
FIG. 5 is a schematic diagram illustrating an example of an operation performed by a collection time allocating unit, according to an embodiment.

FIG. 5 is a schematic diagram illustrating an example of an operation performed by a collection time allocating unit, according to an embodiment. FIG. 5 illustrates an example of an operation of the collection time allocating unit 125. In FIG. 5, the horizontal axis represents a time, and the vertical axis represents an interference value [dBm].

As exemplarily depicted in FIG. 5, the collection time allocating unit 125 plots, on the temporal axis, interference values that are stored in the interference value storage unit 124b depicted in FIG. 4. For example, the collection time allocating unit 125 plots, on the temporal axis, "interference value" of "−92 dBm" of "collection time-period #1" corresponding to the data collecting apparatus identified by "transmission node ID" of "GW2", as depicted by graph 11. The collection time allocating unit 125 also plots, on the temporal axis, "interference value" of "−88 dBm" of "collection time-period #2" corresponding to the data collecting apparatus identified by "transmission node ID" of "GW2", as depicted by graph 12. Furthermore, the collection time allocating unit 125 plots, on the temporal axis, "interference value" of "−95 dBm" of "collection time-period #3" corresponding to the data collecting apparatus identified by "transmission node ID" of "GW2", as depicted by graph 13.

Similarly, the collection time allocating unit 125 plots, on the temporal axis, "interference value" of "−105 dBm" of "collection time-period #1" corresponding to the data collecting apparatus identified by "transmission node ID" of "GW3", as depicted by graph 21. The collection time allocating unit 125 also plots, on the temporal axis, "interference value" of "−95 dBm" of "collection time-period #2" corresponding to the data collecting apparatus identified by "transmission node ID" of "GW3", as depicted by graph 22. Furthermore, the collection time allocating unit 125 plots, on the temporal axis, "interference value" of "−105 dBm" of "collection time-period #3" corresponding to the data collecting apparatus identified by "transmission node ID" of "GW3", as depicted by graph 23.

Then, the collection time allocating unit 125 specifies non-interference time-periods excluding time-periods during which the interference value is equal to or larger than the threshold. For example, the interference value of "−92 dBm" indicated by the graph 11 and the interference value of "−88 dBm" indicated by the graph 12 are equal to or larger than a threshold of "−93 dBm", and therefore the collection time allocating unit 125 specifies non-interference time-periods $T_{ni}$ excluding time-periods corresponding to the graph 11 and the graph 12.

Then, the collection time allocating unit 125 acquires the own collection time-periods from the non-interference time-periods. For example, by searching the non-interference time-periods $T_{ni}$ for time-periods each equal to or larger than a predetermined time-period, the collection time allocating unit 125 acquires the own collection time-periods from the non-interference time $T_{ni}$. Meanwhile, when the collection time allocating unit 125 fails to acquire the own collection time-periods from the non-interference time-periods $T_{ni}$, the collection time allocating unit 125 changes the currently-used communication channel to another communication channel having a different frequency band, and assigns the another communication channel to the reception processing unit 121.

Referring back to FIG. 3, the broadcast signal generating unit 126 generates a broadcast signal that includes information indicating the own collection time-periods acquired by the collection time allocating unit 125. The information indicating the own collection time-periods contains, for example, a start time of the each own collection time-period and an end time of the each own collection time-period.

The transmission processing unit 127 receives the broadcast signal including the information indicating the own collection time-periods from the broadcast signal generating unit 126. The transmission processing unit 127 transmits the broadcast signal including the information indicating the own collection time-periods to node apparatuses 200 associated with the data collecting apparatus 100 by using a predetermined communication channel.

The data transfer processing unit 128 transfers the measured data stored in the data storage unit 124a to an external server apparatus or the like.

Figure 6:
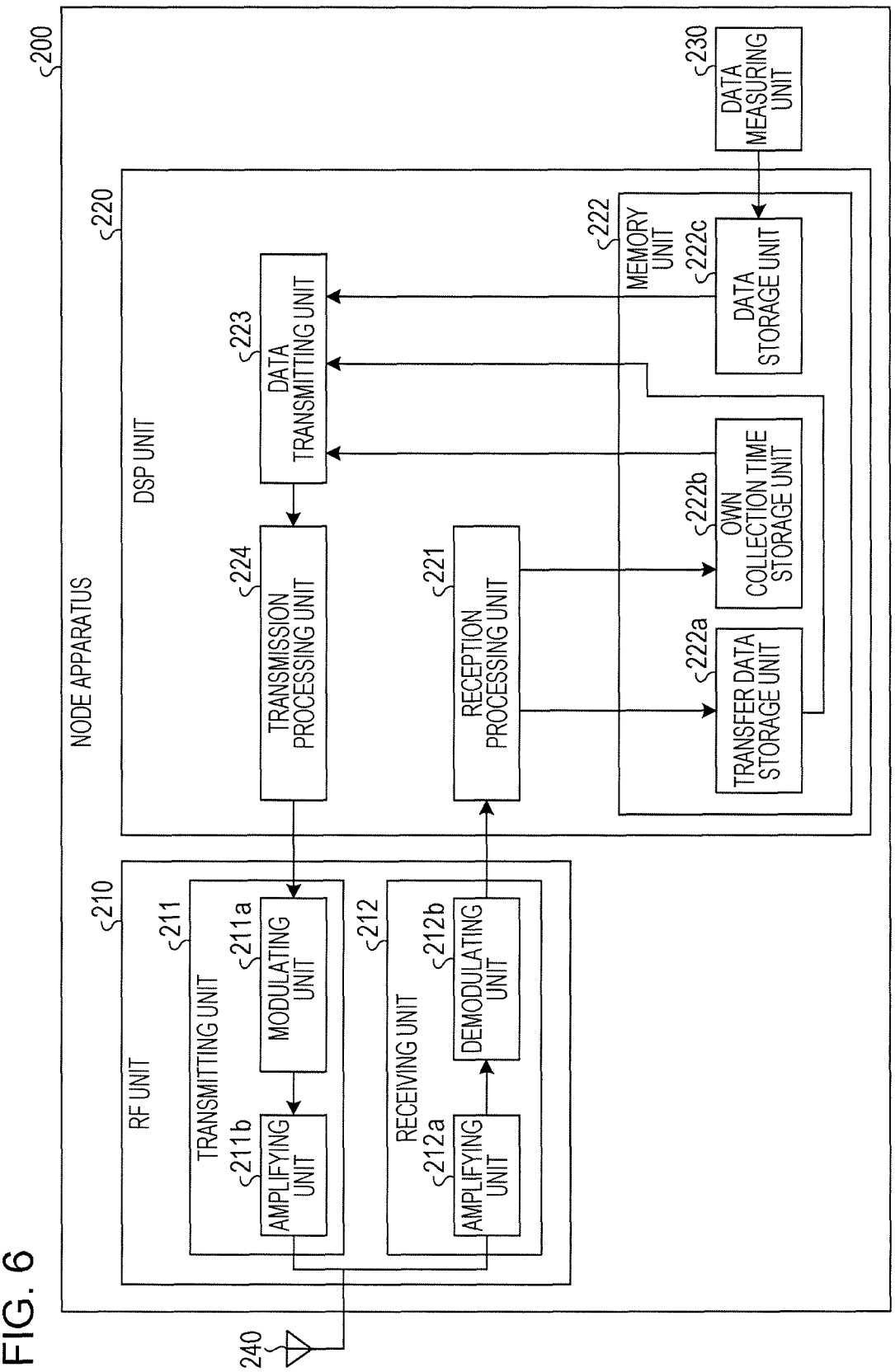
FIG. 6 is a diagram illustrating a configuration example of a node apparatus, according to an embodiment.

FIG. 6 is a diagram illustrating a configuration example of a node apparatus, according to an embodiment. Note that the node apparatus 200 corresponds to any one of the node apparatuses 200a and 200b depicted in FIG. 1.

The node apparatus 200 depicted in FIG. 6 includes an RF unit 210, a DSP unit 220, and a data measuring unit 230. To the RF unit 210, an antenna 240 is connected.

The RF unit 210 includes a transmitting unit 211 and a receiving unit 212. The transmitting unit 211 includes a modulating unit 211a and an amplifying unit 211b. The modulating unit 211a amplitude-modulates a data signal inputted from the DSP unit 220. The amplifying unit 211b amplifies gain of a carrier wave of the data signal amplitude-modulated by the modulating unit 211a, and output the amplified carrier wave to the antenna 240.

The receiving unit 212 includes an amplifying unit 212a and a demodulating unit 212b. The amplifying unit 212a amplifies gain of the carrier wave received from the antenna 240. The demodulating unit 212b amplitude-demodulates the carrier wave inputted from the amplifying unit 212a to demodulate an analog signal from the bit data contained in the carrier wave. The analog signal obtained by the demodulating unit 212b is inputted to the DSP unit 220.

The DSP unit 220 includes a reception processing unit 221, a memory unit 222, a data transmitting unit 223, and a transmission processing unit 224.

The reception processing unit 221 receives a broadcast signal from the data collecting apparatus 100 by using a predetermined communication channel. For example, when the control information of the received signal indicates a value of "00" meaning a broadcast signal, the reception processing unit 221 recognizes the received signal as a broadcast signal. Then, the reception processing unit 221 extracts information about the own collection time-periods (a start time and an end time of for each own collection time-period) contained in the recognized broadcast signal, and stores the extracted information in an own collection time storage unit 222b of the memory unit 222.

Further, the reception processing unit 221 receives a data signal from another node apparatus 200. For example, when the control information of the received signal indicates a value of "10" meaning a data signal, the reception processing unit 221 recognizes the received signal as a data signal. Then, the reception processing unit 221 extracts measured data contained in the recognized data signal, and stores the extracted measured data in a transfer data storage unit 222a of the memory unit 222.

The memory unit 222 includes the transfer data storage unit 222a, the own collection time storage unit 222b, and a data storage unit 222c. The transfer data storage unit 222a stores the measured data contained in the data signal received by the reception processing unit 221. The own collection time storage unit 222b stores information about the own collection time-periods contained in the broadcast signal received by the reception processing unit 221. The data storage unit 222c stores the measured data obtained by measurement by the data measuring unit 230.

The data transmitting unit 223 transmits the measured data to the data collecting apparatus 100, by using a predetermined communication channel, during the own collection time-periods contained in the broadcast signal. For example, when the start time of an own collection time-period stored in the own collection time storage unit 222b comes, the data transmitting unit 223 generates a data signal containing the measured data stored in the data storage unit 222c, and transmits the generated data signal to the data collecting apparatus 100. Then, when the end time of the own collection time-period stored in the own collection time storage unit 222b comes, the data transmitting unit 223 ends the transmission of the data signal containing the measured data.

Further, the data transmitting unit 223 transmits the generated data signal to another node apparatus 200.

The transmission processing unit 224 receives the data signal containing the measured data from the data transmitting unit 223. The transmission processing unit 224 transmits the data signal containing the measured data, by using a predetermined communication channel to the data collecting apparatus 100 associated with the node apparatus 200.

The data measuring unit 230 includes measuring units, such as a temperature sensor, a power meter, or a stress sensor, and measures a temperature, power, stress, and others as measured data, by using the measuring units, and stores the measured data in the data storage unit 222c of the memory unit 222.

Figure 7:
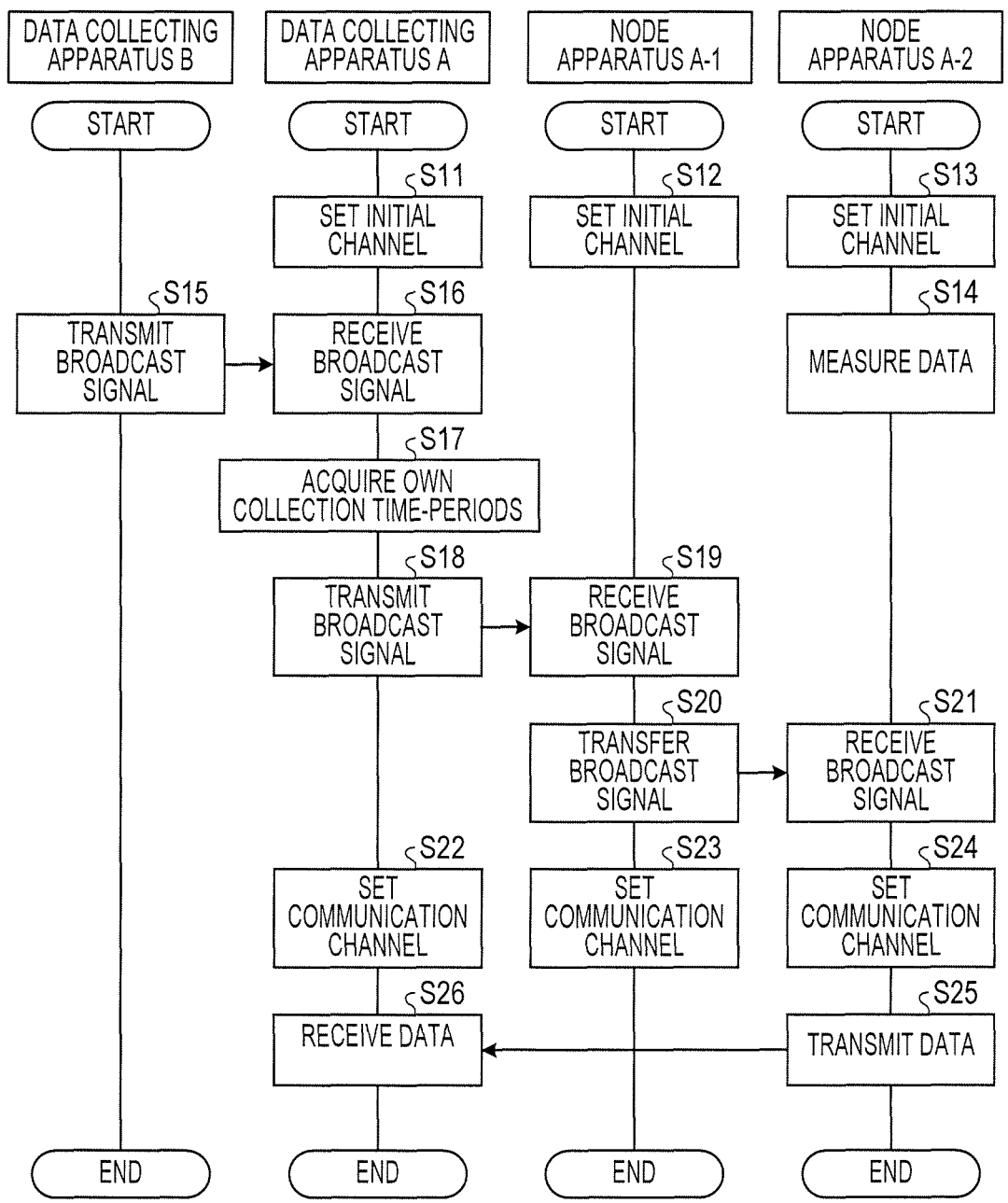
FIG. 7 is a diagram illustrating an example of an operational sequence performed by a data collecting system, according to an embodiment.

FIG. 7 is a diagram illustrating an example of an operational sequence performed by a data collecting system, according to an embodiment. FIG. 7 depicts an example in which measured data is collected, by a data collecting apparatus A receiving a broadcast signal from a data collecting apparatus B, from node apparatuses A-1 and A-2 associated with the data collecting apparatus A.

In operation S11, the data collecting apparatus A sets an initial channel having a predetermined frequency.

In operation S12, the node apparatus A-1 sets an initial channel having the same frequency as that of the data collecting apparatus A.

In operation S13, similarly, the node apparatus A-2 sets an initial channel having the same frequency as that of the data collecting apparatus A.

In operation S14, the node apparatus A-2 measures a temperature, power, stress, and others as measured data.

In operation S15, the data collecting apparatus B transmits a broadcast signal containing a transmission time, collection time-periods during which data are allowed to be collected by the data collecting apparatus B from node apparatuses associated with the data collecting apparatus B, and an occupancy rate indicating a ratio of a duration time during which data are actually collected to the collection time-period.

In operation S16, the data collecting apparatus A receives the broadcast signal from the data collecting apparatus B by using the initial communication channel set in operation S11.

In operation S17, the data collecting apparatus A calculates an interference value based on the occupancy rate contained in the broadcast signal and the received power of the broadcast signal, specifies non-interference time-periods excluding time-periods during which the interference value is equal to or larger than a threshold, and acquires its own collection time-periods from the non-interference time-periods.

In operation S18, The data collecting apparatus A transmits the broadcast signal containing information indicating the own collection time-periods to the node apparatus A-1 by using the initial communication channel set in operation S11.

On the other hand, in operation S19, the node apparatus A-1 receives the broadcast signal from the data collecting apparatus A by using the initial communication channel set in operation S12.

In operation S20, the node apparatus A-1 transfers the received broadcast signal to the node apparatus A-2.

In operation S21, the node apparatus A-2 receives the broadcast signal from the node apparatus A-1 by using the initial communication channel set in operation S13. The node apparatus A-2 extracts the own collection time-periods indicated by the received broadcast signal.

In operation S22, when the start times of the own collection time-periods acquired in operation S17 comes, the data collecting apparatus A sets a communication channel for collecting data.

In operation S23, when the start times of the own collection time-periods indicated by the broadcast signal come, the node apparatus A-1 sets a communication channel having the same frequency as that of the data collecting apparatus A.

In operation S24, when the start times of the own collection time-periods indicated by the broadcast signal come, the node apparatus A-2 also sets a communication channel having the same frequency as that of the data collecting apparatus A.

In operation S25, the node apparatus A-2 transmits the measured data obtained by measurement in operation S14 to the data collecting apparatus A by using the communication channel set in operation S24.

Meanwhile, in operation S26, data collecting apparatus A receives the measured data from the node apparatus A-2 by using the communication channel set in operation S22.

Figure 8:
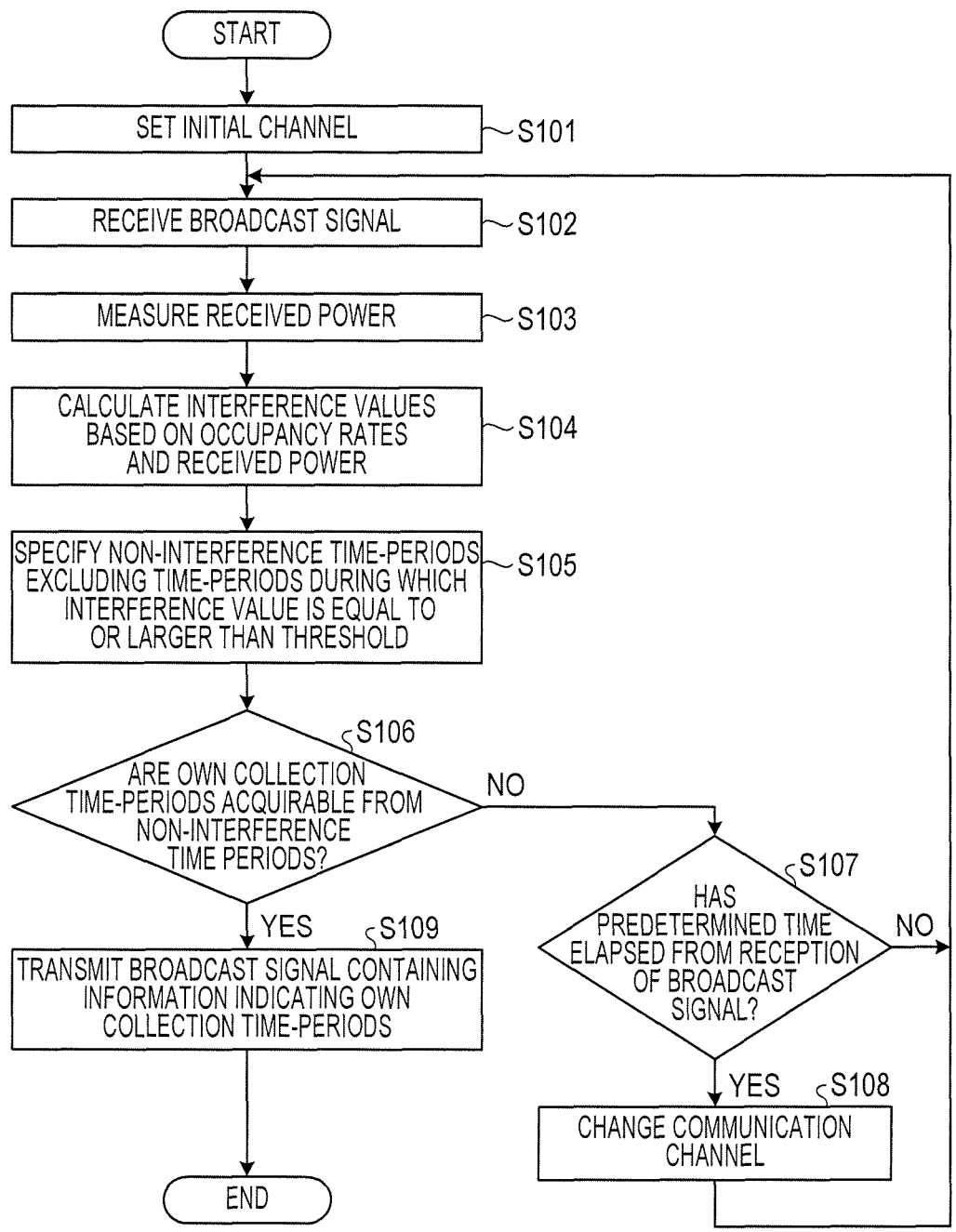
FIG. 8 is a diagram illustrating an example of an operational flowchart performed by a data collecting apparatus, according to an embodiment.

FIG. 8 is a diagram illustrating an example of an operational flowchart performed by a data collecting apparatus, according to an embodiment. The operational flowchart depicted in FIG. 8 more specifically describes the processes in operations S11 to S18 of the data collecting apparatus A described with reference to FIG. 7.

In operation S101, the reception processing unit 121 of the data collecting apparatus A sets an initial communication channel.

In operation S102, the reception processing unit 121 receives a broadcast signal from the data collecting apparatus B by using the currently-set communication channel.

In operation S103, the received power measuring unit 113 measures received power of the broadcast signal that has been received from the data collecting apparatus B.

In operation S104, based on occupancy rates contained in the broadcast signal and the received power of the broadcast signal, the interference value calculating unit 123 calculates interference values during the collection time-periods.

In operation S105, the collection time allocating unit 125 specifies non-interference time-periods excluding time-periods during which the calculated interference value is equal to or larger than a threshold.

In operation S106, the collection time allocating unit 125 determine whether the own collection time-periods are acquirable from the non-interference time-periods, and when it is determined that the own collection time-periods are not acquirable from the non-interference time-periods (NO in operation S106), the collection time allocating unit 125 determines whether a predetermined time has elapsed from reception of the broadcast signal (in operation S107). When the predetermined time has not elapsed from reception of the broadcast signal (NO in operation S107), the process returns to operation S102. On the other hand, when the predetermined time has elapsed from reception of the broadcast signal (YES in operation S107), the collection time allocating unit 125 changes the currently-used communication channel to another communication channel having a different frequency band (in operation S108), and then the process returns to operation S102.

Referring back to the operation S106, when the own collection time-periods have been acquired by the collection time allocating unit 125 from the non-interference time-periods (YES in operation S106), the process proceeds to operation S109.

In operation S109, the transmission processing unit 127 transmits a broadcast signal containing information about the acquired own collection time-range to the node apparatus A-1 associated with the data collecting apparatus A by using the currently-used communication channel.

As described above, according to the data collecting system of the embodiment, the data collecting apparatus receives a broadcast signal received from another data collecting apparatus. Then, based on an occupancy indicated by the broadcast signal and received power of the broadcast signal, the data collecting apparatus calculates interference values each representing a degree of interference from the other data collecting apparatus. Then, the data collecting apparatus specifies non-interference time-periods excluding time-periods during which the interference value is equal to or larger than a threshold, and acquires its own collection time-periods from the non-interference time-periods, and transmits a broadcast signal containing information indicating the own collection time-periods to a node apparatus associated with the data collecting apparatus. Then, the node apparatus transmits measured data to the data collecting apparatus during the own collection time-periods indicated by the broadcast signal. Therefore, even when data is actually collected during another data collection time-period, the data collecting apparatus according to the embodiment may collect measured data from the node apparatus by avoiding a time-period during which excessive interference occurs due to radio waves in the other data collection time-range. As a result, use efficiency of the communication channels for collecting data is improved while avoiding interferences.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system for collecting data using a wireless communication channel, the system comprising:
 a first node apparatus configured to measure first data to be collected; and
 a first data-collecting apparatus configured:
  to collect the first data from the first node apparatus using a predetermined wireless communication channel having a predetermined frequency,
  to receive, from a second data-collecting apparatus to collect second data from a second node apparatus using the predetermined wireless communication channel, a first signal including information on first time-periods each associated with an occupancy rate, using the predetermined wireless communication channel, the first time-periods each indicating a time-period during which the second data are scheduled to be collected from the second node apparatus by the second data-collecting apparatus, the occupancy rate indicating a ratio of a duration time during which the second data are actually collected by the second data-collecting apparatus, to the each first time-period,
  to measure received power of the first signal,
  to calculate, based on the occupancy rate included in the first signal and the received power of the first signal, interference values each indicating a degree of interference that is caused by a radio wave from the second data-collecting apparatus during the each first time-period,
  to determine second time-periods excluding time-periods during which at least one of the calculated interference values is greater than a threshold value,
  to acquire, from the determined second time-periods, third time-periods during which the first data are scheduled to be collected by the first data-collecting apparatus, and to transmit a third signal including information on the third time-periods to the first node apparatus using the predetermined wireless communication channel; and the first node apparatus is configured to transmit, upon receiving the third signal, a second signal including the measured first data to the first data-collecting apparatus during the third time-periods indicated by the received third signal, using the predetermined wireless communication channel.

2. The system of claim 1, wherein the first data-collecting apparatus receives the first signal from each of a plurality of the second data-collecting apparatuses;

the first data-collecting apparatus measures the received power of the first signal for each of the plurality of the second data-collecting apparatuses;

the first data-collecting apparatus calculates the interference values for each of the plurality of the second data-collecting apparatuses;

the first data-collecting apparatus determines fourth time-periods excluding time-periods during which at least one of the calculated interference values is greater than the threshold value; and the first data-collecting apparatus acquires, from the determined fourth time-periods, fifth time-periods during which the first data are scheduled to be collected by the first data-collecting apparatus.

3. The system of claim 2, wherein the first data-collecting apparatus is configured to store the calculated interference values in association with identification information identifying each of the plurality of the second data-collecting apparatuses;

the first data-collecting apparatus, upon receiving the first signal from one of the plurality of the second data collecting apparatuses from which the first signal has been previously received, again calculates the interference values based on the received power of the received first signal and the occupancy rate included in the received first signal; and the first data-collecting apparatus updates the interference values that are stored in association with identification information identifying the one of the plurality of the second data collecting apparatuses, using the calculated interference values.

4. The system of claim 1, wherein when the first data-collecting apparatus fails to acquire the third time-periods from the second time-periods, the first data-collecting apparatus changes a wireless communication channel to be used, from the predetermined wireless communication channel to another wireless communication channel having a frequency different from that of the predetermined wireless communication channel; and the first data-collecting apparatus again receives the first signal from the second data collecting apparatus, using the another wireless communication channel.

5. The system of claim 1, wherein the first signal further includes a transmission time at which the first signal is transmitted from the second data-collecting apparatus; and the first data-collecting apparatus corrects information on the first time-periods, based on a difference between the transmission time included in first signal and a reception time at which the first signal is actually received by the first data-collecting apparatus.

6. A data-collecting apparatus for collecting data using a wireless communication channel, the apparatus comprising:

a radio frequency unit configured:

to receive first data from a first node apparatus using a predetermined wireless communication channel having a predetermined frequency to receive, from another data-collecting apparatus, a first signal including information on first time-periods each associated with an occupancy rate, using the predetermined wireless communication channel, the first time-periods each indicating a time-period during which second data are scheduled to be collected from a second node apparatus by the another data-collecting apparatus, the occupancy rate indicating a ratio of a duration time during which the second data are actually collected by the another data-collecting apparatus, to the each first time-period, and to measure received power of the first signal; and a processor configured:

to calculate, based on the occupancy rate included in the first signal and the received power of the first signal, interference values each indicating a degree of interference that is caused by a radio wave from the second data-collecting apparatus during the each first time-period, to determine second time-periods excluding time-periods during which at least one of the calculated interference values is greater than a threshold value, and to acquire, from the determined second time-periods, third time-periods during which the first data are scheduled to be collected from the first node apparatus by the first data-collecting apparatus, wherein the radio frequency unit transmits a third signal including information on the third time-periods to the first node apparatus using the predetermined wireless communication channel.

7. A method for collecting data using a wireless communication channel, the method comprising:

measuring, by a first node apparatus, first data to be collected;

collecting, by a first data-collecting apparatus, the measured first data from the first node apparatus using a predetermined wireless communication channel having a predetermined frequency;

receiving, by the first data-collecting apparatus, from a second data-collecting apparatus, a first signal including information on first time-periods each associated with an occupancy rate, using the predetermined wireless communication channel, the first time-periods each indicating a time-period during which second data are scheduled to be collected from a second node apparatus by the second data-collecting apparatus, the occupancy rate indicating a ratio of a duration time during which the second data are actually collected by the second data-collecting apparatus, to the each first time-period, measuring, by the first data-collecting apparatus, received power of the first signal, calculating, by the first data-collecting apparatus, based on the occupancy rate included in the first signal and the received power of the first signal, interference values each indicating a degree of interference that is caused by a radio wave from the second data-collecting apparatus during the each first time-period, determining, by the first data-collecting apparatus, second time-periods excluding time-periods during which at least one of the calculated interference values is greater than a threshold value, acquiring, by the first data-collecting apparatus, from the determined second time-periods, third time-periods during which the first data is to be collected by the first data-collecting apparatus, and transmitting, by the first data-collecting apparatus, a third signal including information on the third time-periods to the first node apparatus, using the predetermined wireless communication channel; and receiving, by the first node apparatus, the third signal transmitted from the first data-collecting apparatus, and transmitting, by the first node apparatus, a second signal including the measured first data to the first data-collecting apparatus during the third time-periods, using the predetermined wireless communication channel.

* * * * *